UNITED STATES PATENT OFFICE.

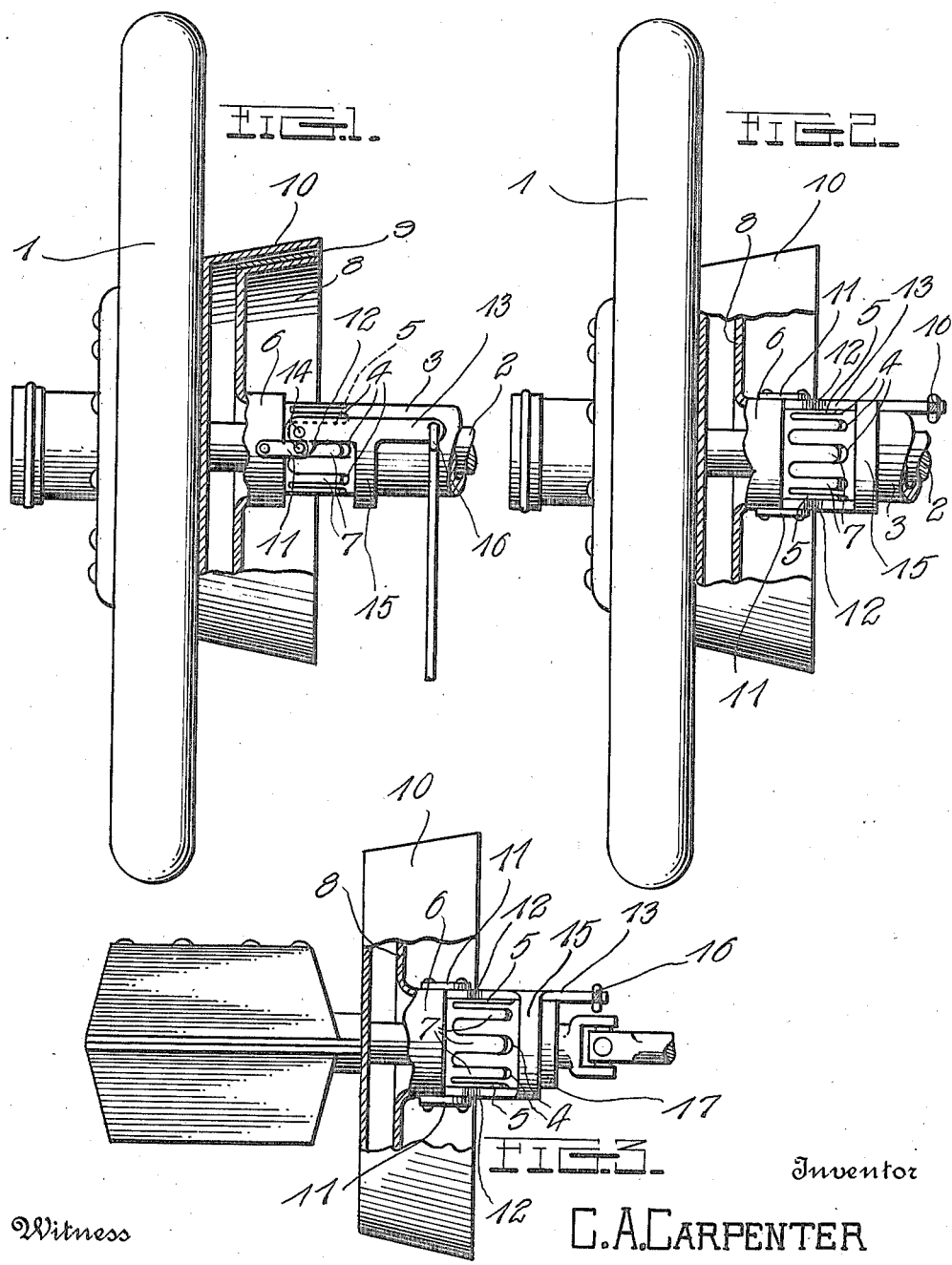

CHARLES ALBERT CARPENTER, OF COLUMBUS JUNCTION, IOWA.

VEHICLE-BRAKE.

1,229,411.             Specification of Letters Patent.    Patented June 12, 1917.

Application filed November 6, 1916.   Serial No. 129,797.

*To all whom it may concern:*

Be it known that I, CHARLES A. CARPENTER, a citizen of the United States, residing at Columbus Junction, in the county of Louisa and State of Iowa, have invented certain new and useful Improvements in Vehicle-Brakes; and I do declare the following to be a full, clear, and exact description of the invention, such as will enable others skilled in the art to which it appertains to make and use the same.

This invention relates to certain new and useful improvements in vehicle brakes.

The primary object of the invention is to provide a means whereby a cone-shaped friction braking element may be slidably or nonrotatably mounted upon the rear axle housing or other stationary cylindrical part of the vehicle in a very efficient and simple manner, said cone-shaped element being adapted to engage the interior of a brake drum when it is moved to its outermost position.

Another object of the invention is to generally improve upon devices of this character by the provision of a durable and extremely inexpensive construction, which will be efficient and reliable in operation, and well adapted to the purpose for which it is designed.

With these and numerous other objects in view the invention consists of certain novel features of construction and the combination and arrangement of parts as will be hereinafter fully described and claimed.

In the accompanying drawings, in which similar reference characters designate like parts throughout the several views—

Figure 1 is a top plan view of an automobile wheel and a portion of the rear axle and housing therefor, showing a brake, constructed in accordance with the present invention, applied thereto, portions of said brake being shown in section;

Fig. 2 is an end elevation of the same; and,

Fig. 3 is a side elevation of a similar brake applied to the transmission mechanism of the vehicle.

Referring more particularly to the drawings, the reference numeral 1 designates one of the rear driving wheels of an automobile, which is connected in the usual manner with the driving axle 2, the latter being inclosed within a cylindrical housing 3. The free end of this housing 3 is reduced slightly in diameter for a short distance, and extending inwardly from the inner end of the reduced portion is a plurality of circumferentially spaced longitudinally extending channels or depressed portions 4. The portions 5 of the housing disposed between the channels or depressed portions 4 are in effect clutch fingers, the purpose of which will be hereinafter described.

Slidably mounted on the reduced end of the housing 3 is a sleeve 6, from the free end of which extends a plurality of circumferentially spaced longitudinally extending fingers 7, the latter being received in the channels 4 in the housing and sliding longitudinally in the same. Fixed to the sleeve 6 in any suitable manner is a cone-shaped friction member 8 having a suitable friction strip secured around its outer edge as at 9, and engaged by the member 8 is a brake drum 10 carried by the wheel 1 of the vehicle.

The above construction provides a non-rotatable mounting for the friction member 8, but this member is free to move longitudinally into contact with the drum 10 thereby effecting an efficient braking action upon the wheel. In order to move the member 8 into contact with the drum 10 the sleeve 6 is connected by diametrically opposite links 11 to ears 12 carried at the pivoted ends of a pair of diametrically opposite levers 13. These levers 13 are pivoted as at 14 to diametrically opposite fingers 5 formed on the axle housing 3 and have their intermediate portions connected by a U-shaped member 15, which in the present instance is here shown formed integrally with the same. This U-shaped member 15 partially encircles the cylindrical housing 3 as shown. The free end of one of the levers 13 is connected by a link 16 to the operating handle (not shown) which is preferably to be arranged within easy reach of the driver of the vehicle. By operating this handle so as to move the levers away from the housing 3, the links 11 will be moved in a longitudinal direction, and will impart a similar movement to the member. This will obviously result in a braking action upon the drum 10.

Although it is preferable to have the drum 10 fixed to one of the rear wheels of the vehicle, yet it may be just as readily fixed to some other movable or rotating part of the same, and in Fig. 3 it is shown mounted upon the shaft which extends from the transmission of the same. In this figure the axle housing 3 is necessarily substituted by an equivalent member 17 which is fixed in any convenient manner (not shown) to a stationary part of the vehicle. The remaining parts of the device are identical with that shown in Figs. 1 and 2. By this arrangement it will be seen that just as effective braking or stopping of the vehicle will take place as before.

From the foregoing description taken in connection with the accompanying drawings, the construction and operation of the device will be readily understood without a more extended explanation.

As various changes in form, proportion, and in the minor details of construction may be resorted to without departing from the spirit of this invention, I do not wish to be limited to the construction herein shown and described other than as claimed.

I claim:

The combination with a device having a fixed cylindrical member, one of the ends of which is reduced slightly in diameter and provided with circumferentially spaced longitudinally extending channels adjacent the reduced end forming fingers between said channels, a sleeve mounted upon the reduced end of said member and having circumferentially spaced longitudinally extending fingers at its free end received slidably in the channels in said member, a cone-shaped braking member carried by said sleeve, a cone-shaped brake drum carried by a rotating part of the device, a pair of levers pivoted at one of their ends to two diametrically opposite first mentioned fingers, ears at the pivoted ends of said levers, links connecting said ears with the diametrically opposite sides of said sleeve, a U-shaped member partially encircling said cylindrical member and having its ends integrally connected to said levers, and a link connected to the free end of one of the levers for operating the same.

In testimony whereof I have hereunto set my hand in the presence of two subscribing witnesses.

CHARLES ALBERT CARPENTER.

Witnesses:
E. O. NEWELL,
ROBT. WEBER.